(12) United States Patent
Kortsen

(10) Patent No.: US 9,599,530 B2
(45) Date of Patent: *Mar. 21, 2017

(54) METHOD OF TESTING A GAS SHUT-DOWN VALVE AND A SYSTEM FOR EXERCISING THE METHOD

(71) Applicant: IOP Marine A/S, Brøndby (DK)

(72) Inventor: Bent Kortsen, Hellerup (DK)

(73) Assignee: IOP Marine A/S, Brondby (DK)

( * ) Notice: Subject to any disclaimer, the term of this patent is extended or adjusted under 35 U.S.C. 154(b) by 244 days.

This patent is subject to a terminal disclaimer.

(21) Appl. No.: 14/380,520

(22) PCT Filed: Feb. 1, 2013

(86) PCT No.: PCT/EP2013/000316
§ 371 (c)(1),
(2) Date: Aug. 22, 2014

(87) PCT Pub. No.: WO2013/124035
PCT Pub. Date: Aug. 29, 2013

(65) Prior Publication Data
US 2015/0007639 A1    Jan. 8, 2015

(30) Foreign Application Priority Data
Feb. 22, 2012   (DK) ................. 2012 00140

(51) Int. Cl.
*G01G 3/08*      (2006.01)
*G01M 3/04*     (2006.01)
(Continued)

(52) U.S. Cl.
CPC ............ *G01M 3/04* (2013.01); *G01M 3/025* (2013.01); *G01M 3/086* (2013.01); *G01M 3/2876* (2013.01)

(58) Field of Classification Search
CPC ............ G01M 3/04; G01M 3/06; G01M 3/08; G01M 3/025; G01M 3/086
See application file for complete search history.

(56) References Cited

U.S. PATENT DOCUMENTS

2008/0314120 A1   12/2008  Maier et al.
2015/0007639 A1*   1/2015  Kortsen ............... G01M 3/086
                                                              73/47

FOREIGN PATENT DOCUMENTS

CN      101858818     10/2010
JP        5980073       5/1984
(Continued)

OTHER PUBLICATIONS

Office Action dated May 23, 2016 from Chinese patent application No. 201380010072.8.
(Continued)

*Primary Examiner* — Erika J Villaluna
(74) *Attorney, Agent, or Firm* — K. David Crockett, Esq.; Crockett & Crockett, PC

(57) ABSTRACT

Method of testing a gas shut-down valve for a combustion engine, by which method the valve is placed in a chamber of a holder 1 and the valve in closed condition is influenced by a non-burnable test gas under pressure to check whether the valve seat and the sealing ring 6 of the valve are close. Further the opening and closing functions of the valve are to be checked.

8 Claims, 4 Drawing Sheets

(51) Int. Cl.
G01M 3/08 (2006.01)
G01M 3/28 (2006.01)
G01M 3/02 (2006.01)

(56) References Cited

FOREIGN PATENT DOCUMENTS

| | | |
|---|---|---|
| JP | 62198727 | 9/1987 |
| JP | 62173546 | 11/1987 |
| JP | 2009156600 | 7/2009 |
| JP | 2011220195 | 11/2011 |
| WO | WO2011160317 | 12/2011 |

OTHER PUBLICATIONS

Office Action dated Jul. 25, 2016 from Japanese patent application No. 2014558030.
Office Action dated Jun. 21, 2016 from Korean patent application No. KR1020147021191.

* cited by examiner

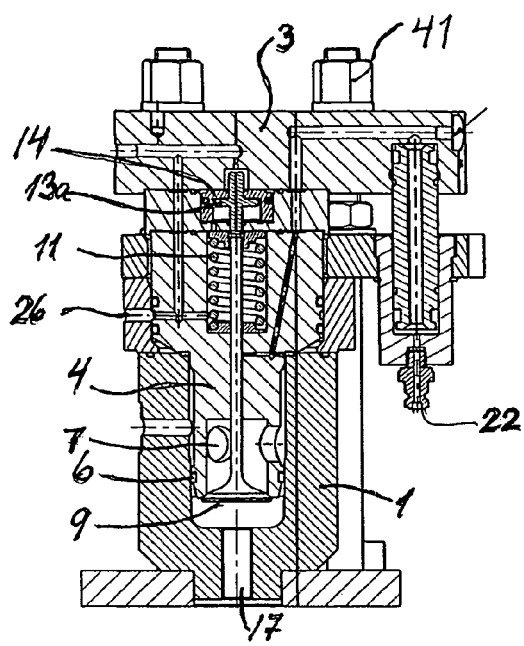
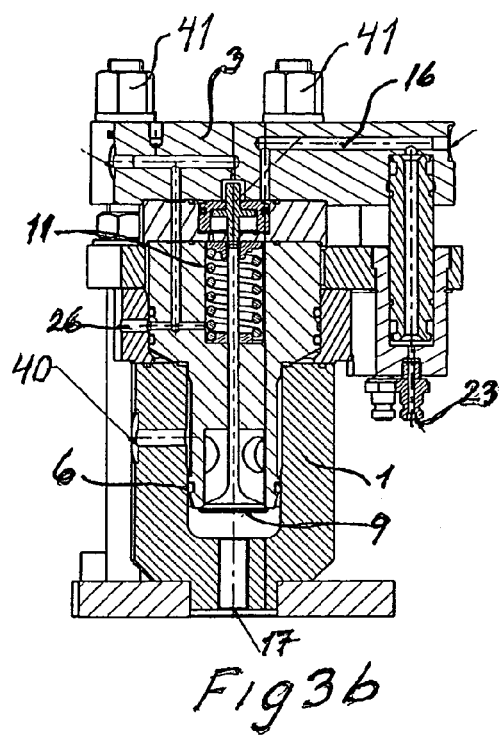
Fig 3a  Fig 3b
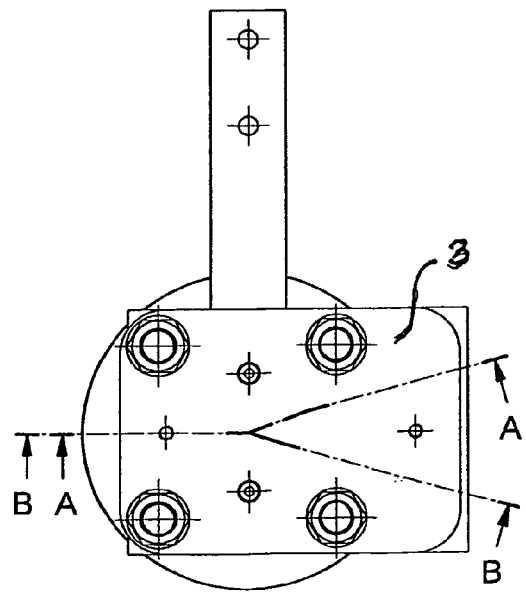
Fig 2

METHOD OF TESTING A GAS SHUT-DOWN VALVE AND A SYSTEM FOR EXERCISING THE METHOD

FIELD OF THE INVENTION

The invention is related to a method of testing a gas shut-down valve for a combustion engine for leakages at the valve seat and at a sealing ring surrounding the valve.

BACKGROUND ART

WO 9824014 describes a system of testing fuel injection valves by means of pressurized gas. Such a system is not sufficient for testing of gas shut-down valves for combustion engines where even the smallest leakages are unacceptable and may result in an explosion.

A system of testing of gas injection valves is also known. This system is however not satisfactory.

Finally GB 1285705 describes an apparatus for testing a valve. The valve is placed in a holder and the valve is in closed condition influenced by a not burnable pressurized gas to check whether the valve seat is closed. However this apparatus is not designed for testing of a valve which is surrounded by a sealing ring when it is in operation.

DESCRIPTION OF THE INVENTION

According to the invention the valve with the surrounding sealing ring is placed in a chamber of a holder so that the chamber due to the sealing ring is divided into a first portion and a second portion including the valve seat, and the valve is in closed condition influenced by a non-burnable gas under pressure, the test gas being supplied to the second portion of the chamber. As a result the test gas can seep into the first portion of the chamber if the valve seat and/or the sealing ring are leaky. The test gas may according to the invention be supplied to the second portion of the chamber at a pressure of about 300 bar, the rest of the valve being supplied with sealing oil at a pressure higher than the gas pressure. As a result the test gas is prohibited from entering the valve.

In a special advantageous embodiment the test gas may be composed of nitrogen.

The valve may according to the invention be opened by means of control oil supplied to the valve.

In a special advantageous embodiment the pressure of the test gas may be increased to above 300 bar by means of a compressor driven by means of the said control oil. Finally according to the invention the gas which during the supply of gas to the second portion of the chamber escapes through the valve seat and/or the sealing ring of the valve, may be detected through a to the first portion of the chamber connected gas discharge tube which is connected to a separate container with liquid.

The invention is also related to a system of testing a gas shut-down valve for a combustion engine comprising a holder with a chamber, in which the valve can be placed, said system also comprising a unit for supplying of sealing oil to the valve, a unit for supplying of control oil to the valve, a unit for supplying of test gas to the holder and a unit for testing the valve for leakages at the valve seat and/or the sealing ring. As a result the valve could be tested during circumstances corresponding to circumstances when the valve is in operation.

BRIEF DESCRIPTION OF THE INVENTION

The invention will be described in the following with reference to the drawings in which FIG. 1 illustrates a system of testing a gas shut-down valve;

FIG. 2 illustrates a holder in which the shut-down valve is placed, seen from above;

FIG. 3a is a sectional view of the valve placed in the holder, seen after the line A-A FIG. 3b a sectional view of the valve placed in the holder, seen after the line B-B;

BEST MODES FOR CARRYING OUT THE INVENTION

Gas shut-down valves for combustion engines such as two-stroke engines has to be checked regularly and very often due to the fact that leakages if any may give occasion for escape of explosive gasses. The opening and closing functions of the valve also have to be checked.

Figure 1:
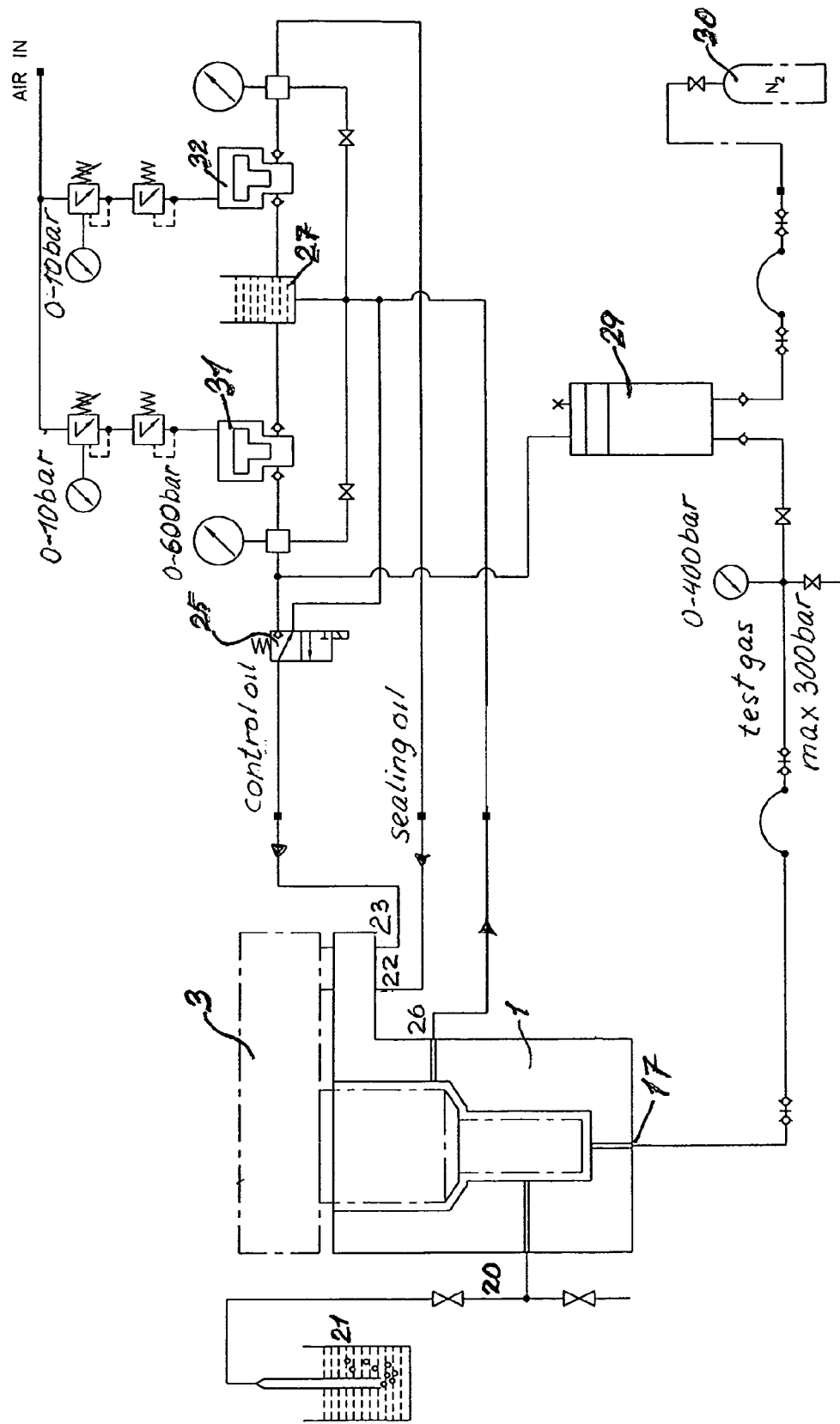
Figure 5:
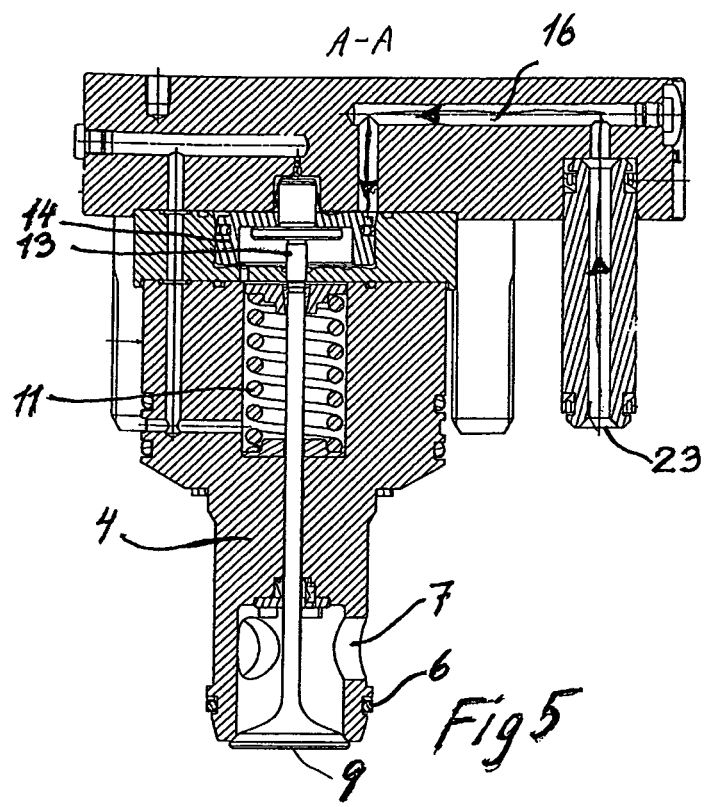
FIG. 5 illustrates the valve with an illustration of the supply of control oil.
Figure 4:
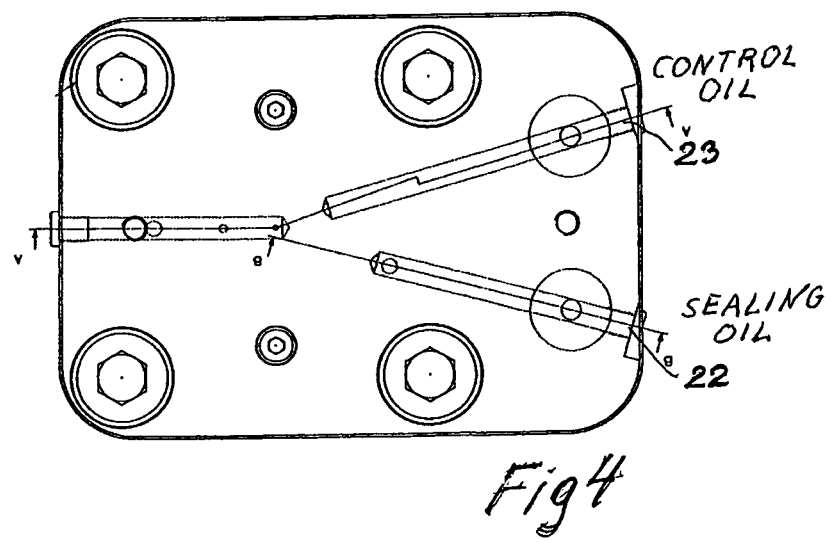
FIG. 4 illustrates the holder seen from above, the channels for supplying the control oil and the sealing oil being illustrated by means of dotted lines.

FIG. 1 illustrates a system according to the invention of testing a gas shut-down valve. The system comprises a holder 1 for the valve to be tested. The holder 1 with the valve is illustrated in detail in FIGS. 3a and 3b. A top piece 3 is placed over the valve and sealing oil and control oil is supplied to the valve through the top piece 3.

Figure 6:
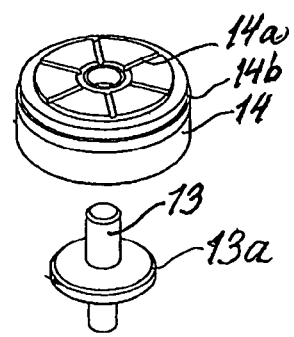
FIG. 6 illustrates a slide to be influenced by the control oil so as to control the opening of the valve, and the body in which the slide may be displaced.
Figure 7:
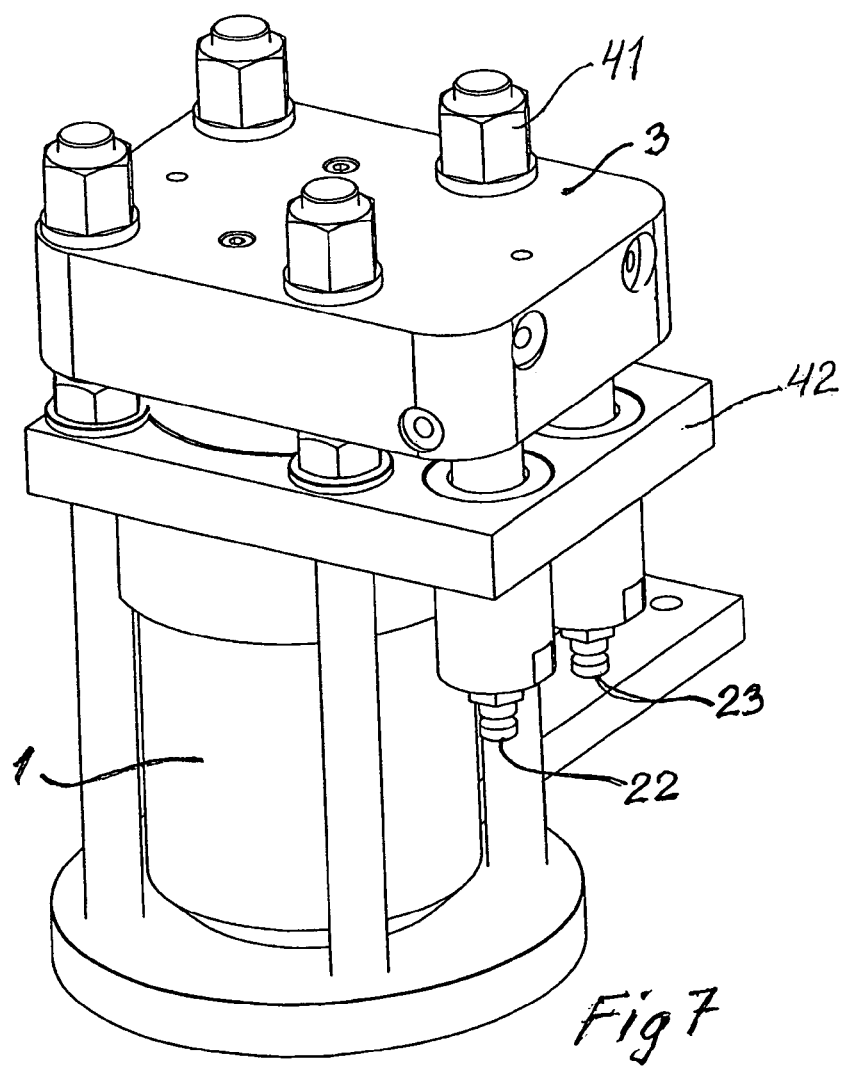
FIG. 7 is a perspective view of the holder in which the shut-down valve is placed.

The holder 1 in which the valve is placed, conf. FIGS. 3a and 3b, has two substantially cylindrical cavities, an upper cavity of a relatively great diameter and a lower cavity also referred to as a chamber of a substantially smaller diameter. The body 4 of the valve has an upper portion of a relatively great diameter and a lower portion of a considerably smaller diameter, substantially corresponding to the diameters of said cavities in the holder 1. The lower portion of the valve is surrounded by a sealing ring 6 so that the lower portion of the valve fit tightly to the inner side of the lower cavity in the holder 1. This sealing ring 6 divides the lower cavity (the chamber) into a first and a second portion. In the lower portion of the valve there are some side openings 7 which are connected to the second portion of the lower cavity of the holder 1. At the lower portion of the valve there is also an opening to the first portion of the lower cavity in the holder. This opening is normally closed by means of a disk valve 9 connected to a valve rod. The uppermost portion of the valve rod is surrounded by and influenced by a compression spring 11 so that the valve rod is pressed upwards, and the disk valve 9 closes the said opening. The valve rod is connected to an above placed slide 13 in form of a rod shaped portion surrounded by a disk formed portion 13a, conf. FIG. 6. This disk formed portion 13a can be displaced up and down in a cavity of a body 14, the upper part of the rod formed portion of the rod formed body being guided up through the body 14.

The slide 13 may be displaced in downward direction by applying pressurized control oil through channels 16 in the top piece 3 to the over side of the body 14 surrounding the slide 13 and from there through small grooves 14a in the over side of the body 14 to a cavity in the top piece 3 over the top (piston B) of the rod formed portion of the slide 13. The body 14 surrounding the slide 13 acts in itself as a piston (piston A). By applying of control oil the oil pressure will activate piston A and piston B at the same time. The flow of oil passes from the underside of the piston A through the grooves 14a in the over side of piston A to the center from where the oil is guided up to piston B. As a result there is a pressure at a relatively large area (piston A). As a result the disk valve 9 opens by overcoming the gas pressure at the disk valve 9. However the piston A only has a short downward movement of about 0.5 mm. before the underside of the piston A contacts a bottom face. To operate as intended the piston A has to be surrounded by a sealing ring 14b. When the displacement of the piston A stops, the piston B continues by opening the gas valve and the gas valve is completely open when the displacement of about 10 mm. of the piston B stops in the bottom of the cavity in piston A. The pressure area at piston B is essentially smaller, as the pressure at piston B only has to overcome the pressure of the spring 11 to keep the gas valve open. The supply of control oil is controlled by means of a slide valve 25 in the pipe for supplying of control oil.

As previously mentioned there is also an opening 17 in the bottom of the holder 3, conf. FIG. 1, for supply of test gas from a gas container 30, typically containing N2 at a pressure of at least 30 bar. Other test gasses could also be used. Through a compressor 29 for increasing the pressure the test gas is guided to the first portion of the lower chamber of the holder. In case of leakages at the valve seat of the disk valve 9 and/or the sealing ring 6 test gas will escape through an opening 40 to the second portion of the lower chamber of the holder. This opening 40 is through a hose 20 connected to a container 21 with liquid. Discharges of test gas if any will therefore be visible by means of bobbles in container 21.

All the portions of the holder 1 are secured to flanges 42 kept together by means of bolts 41.

The placement of the valve in the holder 1 corresponds to the placement in a combustion engine, typically a two-stroke engine.

FIG. 1 illustrates the whole system of testing a gas shut-down valve. Besides the holder 1 with the two cavities the system also comprises a pipe for applying of sealing oil from a tank 27 at a pressure higher than the pressure of the test gas, f. inst. 340 bar. The sealing oil is supplied to an opening 22 and the purpose of the higher pressure of the sealing oil is to secure that the test gas does not enter the valve. The figure also illustrates a pipe for supplying of control oil from the tank 27 at a pressure of f. inst. 300 bar to an opening 23. The supply of control oil is controlled by means of the electrically controlled slide valve 25 in the pipe. The sealing oil and the control oil is returned from the opening 26 through a tube to the tank 27 from where the oil is returned to the holder 1. Some air driven pumps 31,32 are adapted to increase the pressure of control oil and sealing oil to suitable values.

In a special advantageous embodiment the pressure of the test gas is increased to about 300 bar by means of the compressor 29 in the pipe for supplying of gas.

A ventilation is made before use by means of the non-burnable test gas under pressure so as to remove remaining oxygen in the chambers of the holder, as such remaining oxygen otherwise could cause an explosion.

The invention claimed is:

1. A method of testing a gas shut-down valve for a combustion engine for leakages at the valve seat and at a sealing ring (6) surrounding the valve characterized in that the valve with the surrounding sealing ring is placed in a chamber of a holder (1), so that the chamber is divided into a first portion and a second portion including the valve seat, and the valve in closed condition is influenced by a non-burnable test gas under pressure, the test gas being supplied to the second portion of the chamber and the remainder of the valve being supplied with sealing oil at a pressure higher than the pressure of the gas.

2. A method according to claim 1 characterized in that the test gas is supplied to the second portion of the chamber under a pressure of about 300 bar.

3. A method according to claim 1, characterized by the test gas is composed of nitrogen.

4. A method according to claim 1, characterized in that the valve can be opened by means of control oil supplied to the valve.

5. A method according to claim 1, characterized in that the pressure of the test gas is increased to about 300 bar by means of a compressor (29) driven by means of control oil.

6. A method according to claim 1, characterized in that the test gas which during the supply of test gas to the second portion of the chamber escapes through the valve seat and/or the sealing ring (6) of the valve, is detected through the first portion of the chamber connected gas discharge tube (20) which is connected to a separate container (21) with liquid.

7. A system of testing a shut-down valve for a combustion engine comprising a holder (1) with a chamber, in which the valve can be placed, said system further comprising a unit for supplying of sealing oil to the valve, a unit for supplying of control oil to the valve, a unit for supplying of test gas to the holder (1) and a unit for testing the valve for leakages at the valve seat and/or the sealing ring (6) by observing discharges of gas if any from the holder.

8. A method of testing a gas shut-down valve of a combustion engine for leakage, said valve comprising a valve seat and a sealing ring surrounding the valve, said method comprising the steps of:
   placing the valve in a chamber of a holder so that the sealing ring establishes a first portion and a second portion in the chamber, and said valve seat is disposed in the first portion;
   applying test gas to the first portion of the chamber with the valve seat;
   applying sealing oil to the remainder of the valve;
   wherein the sealing oil is applied at a pressure higher than the pressure of the test gas;
   porting any test gas which passes the valve seat or the sealing ring to a liquid-filled container for detection of any leakage of gas past the valve seat or sealing ring.

* * * * *